United States Patent
Okura et al.

(10) Patent No.: US 9,289,679 B2
(45) Date of Patent: Mar. 22, 2016

(54) INFORMATION STORAGE MEDIUM, INFORMATION INPUT DEVICE, AND CONTROL METHOD OF SAME

(75) Inventors: Junya Okura, Saitama (JP); Toshitake Tsuchikura, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 126 days.

(21) Appl. No.: 13/643,686

(22) PCT Filed: Dec. 27, 2010

(86) PCT No.: PCT/JP2010/073580
§ 371 (c)(1),
(2), (4) Date: Oct. 26, 2012

(87) PCT Pub. No.: WO2011/135757
PCT Pub. Date: Nov. 3, 2011

(65) Prior Publication Data
US 2013/0038532 A1 Feb. 14, 2013

(30) Foreign Application Priority Data
Apr. 30, 2010 (JP) .................................. 2010-105856

(51) Int. Cl.
*G06F 3/033* (2013.01)
*A63F 13/20* (2014.01)
(Continued)

(52) U.S. Cl.
CPC .............. *A63F 13/06* (2013.01); *G06F 1/1694* (2013.01); *G06F 3/011* (2013.01); *G06F 3/017* (2013.01);
(Continued)

(58) Field of Classification Search
CPC ......... G06F 3/011; G06F 3/017; G06F 3/033; G06F 3/03; G06F 3/04815; G06F 1/1694; G06F 3/04883; A63F 13/06; A63F 13/02; A63F 2300/105; A63F 2300/1075

USPC ............................................ 345/158; 463/37
See application file for complete search history.

(56) References Cited

U.S. PATENT DOCUMENTS 7,431,216 B2  10/2008  Weinans
8,216,070 B2   7/2012  Okamura
(Continued)

FOREIGN PATENT DOCUMENTS

JP  62040517 A  2/1987
JP  11095910 A  4/1999
(Continued)

OTHER PUBLICATIONS

International Preliminary Report on Patentability for corresponding PCT Application No. PCT/JP2010/073580, dated Dec. 20, 2012.
(Continued)

*Primary Examiner* — Alexander Eisen
*Assistant Examiner* — Abhishek Sarma
(74) *Attorney, Agent, or Firm* — Matthew B. Dernier, Esq.

(57) ABSTRACT

Provided is a program capable of facilitating an operation input made by a user. A computer-readable information storage medium has stored thereon a program for controlling a computer connected to an operation input device to function so as to obtain, for each time unit, an input value indicating specifics of the operation input of the user received by the operation input device, and to calculate, as an output value of a parameter to be operated, a value obtained by changing a reference value by a change amount, the reference value being determined by one of a plurality of obtained input values, the change amount being determined by each of the plurality of obtained input values.

16 Claims, 6 Drawing Sheets

(51) Int. Cl.
*G06F 1/16* (2006.01)
*G06F 3/01* (2006.01)
*G06F 3/0481* (2013.01)
*G06F 3/0488* (2013.01)

(52) U.S. Cl.
CPC ........ *G06F 3/04815* (2013.01); *G06F 3/04883* (2013.01); *A63F 2300/105* (2013.01); *A63F 2300/1075* (2013.01)

(56) References Cited

U.S. PATENT DOCUMENTS

| | | | |
|---|---|---|---|
| 2003/0216179 A1* | 11/2003 | Suzuki et al. | 463/35 |
| 2003/0234768 A1* | 12/2003 | Rekimoto et al. | 345/169 |
| 2007/0109258 A1 | 5/2007 | Hendrik Weinans | |
| 2007/0213127 A1* | 9/2007 | Sato | 463/36 |
| 2007/0265088 A1* | 11/2007 | Nakada et al. | 463/37 |
| 2008/0015031 A1* | 1/2008 | Koizumi et al. | 463/43 |
| 2008/0222558 A1* | 9/2008 | Cho et al. | 715/784 |
| 2009/0209344 A1 | 8/2009 | Okamura | |
| 2009/0213081 A1* | 8/2009 | Case, Jr. | 345/173 |
| 2009/0295722 A1 | 12/2009 | Yamamoto | |
| 2010/0188353 A1* | 7/2010 | Yoon et al. | 345/173 |
| 2010/0289760 A1 | 11/2010 | Jonoshita et al. | |
| 2011/0053691 A1* | 3/2011 | Bryant et al. | 463/37 |
| 2011/0074698 A1* | 3/2011 | Rapp et al. | 345/173 |
| 2011/0118025 A1* | 5/2011 | Lukas et al. | 463/37 |
| 2011/0227913 A1* | 9/2011 | Hyndman | 345/419 |

FOREIGN PATENT DOCUMENTS

| | | |
|---|---|---|
| JP | 2007041909 A | 2/2007 |
| JP | 2007310840 A | 11/2007 |
| JP | 2009516280 A | 4/2009 |
| JP | 2009189660 A | 8/2009 |
| JP | 2010015535 A | 1/2010 |
| WO | 2007057303 | 5/2007 |
| WO | 2009034982 A1 | 3/2009 |

OTHER PUBLICATIONS

European Search Report or corresponding EP Application No. 10850767, dated Jan. 2, 2014.
International Search Report for corresponding PCT Application No. PCT/JP2010/073580, dated Apr. 19, 2011.
Office Action for corresponding JP Patent Application No. 2014-057631, dated Jul. 21, 2015.

* cited by examiner

INFORMATION STORAGE MEDIUM, INFORMATION INPUT DEVICE, AND CONTROL METHOD OF SAME

TECHNICAL FIELD

The present invention relates to an information input device for receiving an operation input made by a user, a method of controlling the information input device, and an information storage medium having stored thereon a program for controlling the information input device.

BACKGROUND ART

There is a type of information input device that receives an operation input made by a user on an operation input device and performs various kinds of information processing. An information input device of this type obtains an input value that indicates the specifics of an operation input made by a user on an operation input device, and executes processing dictated by the input value, for example, moving a character or shifting a view point set within a virtual space. Concrete examples of the operation input include an operation in which the user touches a touch sensor with a finger, a stylus, or the like and an operation in which the user manipulates an operating member such as an analog stick. Some information input devices include, as an operation input device, a built-in sensor (e.g., a gyroscope) for detecting the tilt of a casing. When a user makes an operation that tilts the casing of this type of information input device, the information input device obtains as an input value a detection result value of the sensor which indicates the tilt, to thereby perform various kinds of information processing.

SUMMARY OF INVENTION

Technical Problem

In the information input device described above, the range of values that an input value takes is limited due to physical restrictions of the operation input device and the like, and simply using an input value that indicates the specifics of an operation input being made by the user at one moment therefore limits the range of values that the user can input. For instance, consider processing in which the direction of a view point set within a virtual space is changed by an amount determined by the amount of tilt of the casing that results from an operation performed by the user. In this case, changing the direction of the view point to a great degree requires tilting the casing to a correspondingly large degree, and the user may find it difficult to make an operation input of a large value depending on the shape of the casing, the way the user holds the casing, and the like.

Alternatively, an input value that indicates the specifics of an operation input made by the user may be used as the change amount per unit time of a parameter to be operated. In the case where this operation input method is applied to the example described above, while the user keeps the casing of the information input device tilted in a constant direction, the information input device continuously changes the viewing direction in a direction corresponding to the direction of the tilt. With this operation input method, however, fine adjustment of the parameter value is not easy and the user may find the operation difficult in some cases.

The present invention has been made in view of the reality described above, and an object of the present invention is to provide an information input device capable of facilitating an operation input made by a user when the value of a parameter to be operated is changed in accordance with an input value that indicates the specifics of the operation input made by the user, a method of controlling the information input device, and an information storage medium having stored thereon a program for controlling the information input device.

Solution to Problem

According to the present invention, there is provided a computer-readable information storage medium having stored thereon a program for controlling a computer connected to an operation input device, which receives an operation input of a user, to function as: input value obtaining means for obtaining, at a predetermined interval, an input value indicating specifics of the operation input received by the operation input device; and output value calculating means for calculating an output value of a parameter to be operated, based on a plurality of input values obtained by the input value obtaining means, in which the output value calculating means calculates as the output value a value obtained by changing a reference value by a change amount, the reference value being determined by one of the plurality of input values obtained by the input value obtaining means, the change amount being determined by each of the plurality of input values which are obtained by the input value obtaining means at predetermined intervals.

Further, in the above-mentioned program, the reference value may be a value determined by an input value that the input value obtaining means has obtained last time.

Further, in the above-mentioned program, the output value calculating means may output as the output value a value obtained by changing the reference value by a change amount that is determined by each of a plurality of input values obtained by the input value obtaining means after the user executes a given start operation.

Alternatively, the output value calculating means may output as the output value a value obtained by changing the reference value by a change amount that is determined by each of a plurality of input values obtained by the input value obtaining means after the user executes a given start operation and after a given start condition is satisfied.

Further, when the input value obtained by the input value obtaining means exceeds a predetermined value, the output value calculating means may calculate the output value by using as the change amount an upper limit value which is determined in advance.

Further, in the above-mentioned program, the operation input device may be a sensor for detecting a tilt of a casing which is gripped by the user with hands, when the user makes an operation input by tilting the casing, the input value obtaining means may obtain as the input value a value indicating a direction and amount of the tilt of the casing which is caused by the operation, the output value may be a value indicating a direction and a magnitude, the reference value may be a value indicating a direction and a magnitude that are determined by a tilt direction and tilt amount indicated by the one of the plurality of input values, and the change amount may be an amount of change whose magnitude is determined by the amount of tilt in a direction determined by a tilt direction that is indicated by an associated input value.

In addition, in the above-mentioned program, the input value may be constituted of a first input component value and a second input component value which indicate respective amounts of rotation about two reference axes, the output value may be constituted of a first output component value and a second output component value which indicate respective magnitudes along two reference directions, and the output value calculating means may determine a change amount with respect to the first output component value based on the first input component value, determine a change amount with respect to the second output component value based on the second input component value, and determine the change amount with respect to the first output component value and the change amount with respect to the second output component value by calculation methods different from each other.

Further, in the above-mentioned program, the reference value may be determined so that a ratio of a change of the reference value to a change of the input value in a range where an absolute value of the input value exceeds a given value is smaller than a ratio of the change of the reference value to the change of the input value in a range where the absolute value of the input value is equal to or less than the given value.

Further, the above-mentioned program may control the computer to further function as means for displaying on a display screen an image indicating a magnitude of the change amount that is determined by an input value obtained by the input value obtaining means last time when the output value calculating means calculates the output value.

According to the present invention, there is also provided an information input device connected to an operation input device, which receives an operation input of a user, including: input value obtaining means for obtaining, at a predetermined interval, an input value indicating specifics of the operation input received by the operation input device; and output value calculating means for calculating an output value of a parameter to be operated, based on a plurality of input values obtained by the input value obtaining means, in which the output value calculating means calculates as the output value a value obtained by changing a reference value by a change amount, the reference value being determined by one of the plurality of input values obtained by the input value obtaining means, the change amount being determined by each of the plurality of input values which are obtained by the input value obtaining means at predetermined intervals.

Further, in the above-mentioned information input device, the above-mentioned information input device may further include: a touch sensor disposed on a front face of a casing of the information input device and a touch sensor disposed on a rear face of the casing; and start operation receiving means for receiving, as a start operation, an operation in which the user touches the touch sensor disposed on the front face of the casing with at least one finger of each of both hands and also touches the touch sensor disposed on the rear face of the casing with at least one finger of each of both hands, the operation input device may be a sensor for detecting a tilt of the casing, and the output value calculating means may output as the output value a value obtained by changing the reference value by a change amount that is determined by each of a plurality of input values obtained by the input value obtaining means after the start operation is received.

In addition, in the above-mentioned information input device, the start operation receiving means may receive, as an ending operation, an operation of breaking up a state in which the user touches the touch sensor disposed on the front face of the casing with at least one finger of each of both hands and also touches the touch sensor disposed on the rear face of the casing with at least one finger of each of both hands, and, when the ending operation is received, the output value calculating means may end the calculation of the output value.

According to the present invention, there is also provided a method of controlling an information input device, the method including: an input value obtaining step of obtaining, at a predetermined interval, an input value indicating specifics of an operation input that is received by an operation input device for receiving an operation input of a user; and an output value calculating step of calculating an output value of a parameter to be operated, based on a plurality of input values obtained in the input value obtaining step, in which, in the output value calculating step, a value obtained by changing a reference value by a change amount is calculated as the output value, the reference value being determined by one of the plurality of input values obtained in the input value obtaining step, the change amount being determined by each of the plurality of input values which are obtained at predetermined intervals in the input value obtaining step.

DESCRIPTION OF EMBODIMENTS

An embodiment of the present invention is described below in detail with reference to the drawings.

Figure 1A:
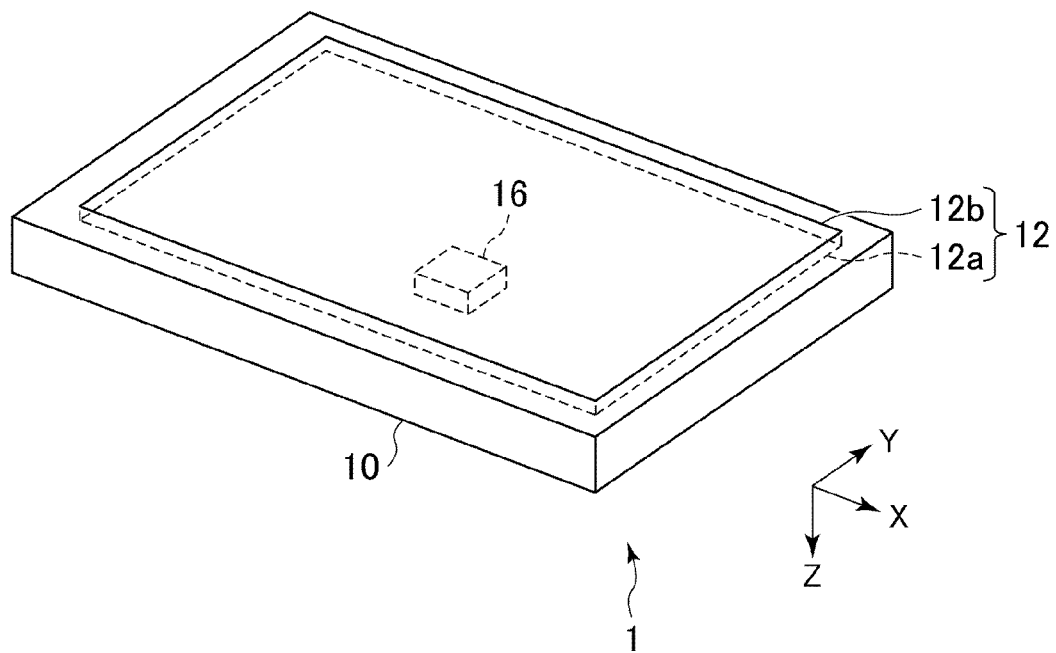
FIG. 1A A perspective view illustrating the exterior of an information input device according to an embodiment of the present invention.
Figure 1B:
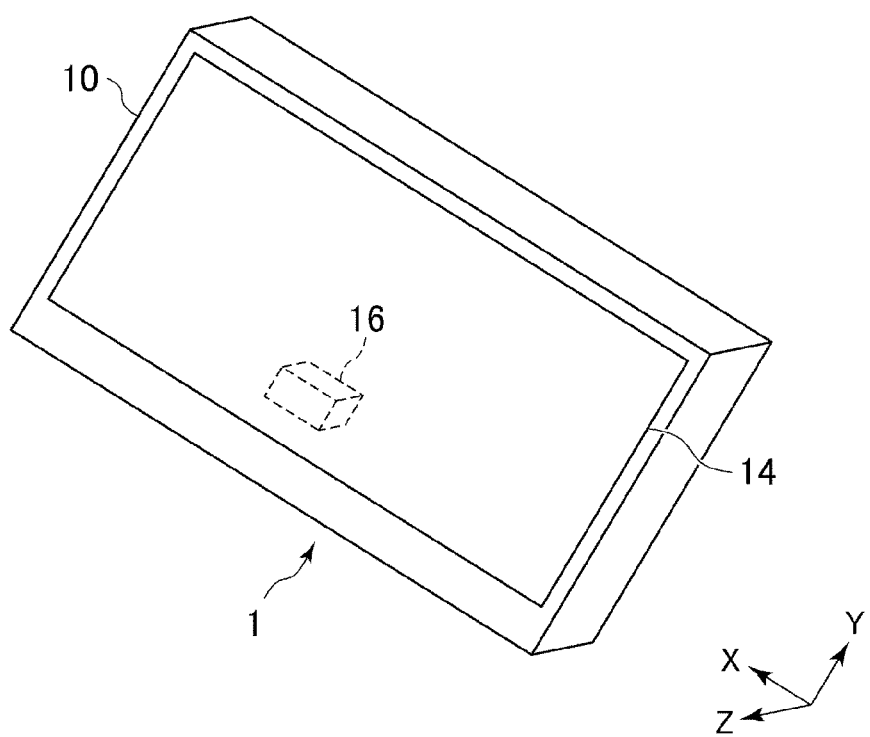
FIG. 1B Another perspective view illustrating the exterior of the information input device according to the embodiment of the present invention.

FIGS. 1A and 1B are perspective views illustrating the exterior of an information input device 1 according to an embodiment of the present invention, and respectively illustrate the information input device 1 viewed from its front face (front) side and the information input device 1 viewed from its rear face side. The information input device 1 according to this embodiment is a portable game machine in the following description.

As illustrated in these diagrams, a casing 10 of the information input device 1 is overall shaped like a substantially rectangular flat board, and a touch panel 12 is provided on a front face of the casing 10. The touch panel 12 has a substantially rectangular shape and is constituted of a display 12a and a front touch sensor 12b. The display 12a can be a liquid crystal display panel, an organic EL display panel, or other types of image display devices.

The front touch sensor 12b is overlaid on the display 12a and includes a substantially rectangular detection surface having a shape and size corresponding to a display surface of the display 12a. When an object such as a user's finger or a stylus comes into contact with the detection surface, the front touch sensor 12b detects a position of contact with the object. It is not necessary that the touch sensor 12b detect the position of the object only when the object contacts the detection surface, but the touch sensor 12b may detect the position of the object with respect to the detection surface when the object approaches to a detectable range on the detection surface. The front touch sensor 12b can be a device of any type, for example, the capacitive type, the pressure-sensitive type, or the optical type, as long as the device is capable of detecting the position of an object on the detection surface. The front touch sensor 12b in this embodiment is a multi-point touch sensor capable of detecting a contact with an object in a plurality of places.

In this embodiment, a rear touch sensor 14 is further disposed on the rear side of the casing 10 so as to be opposed to the touch panel 12. The rear touch sensor 14 includes a substantially rectangular detection surface having a shape and size corresponding to the display surface of the display 12a. In short, the display surface of the display 12a, the detection surface of the front touch sensor 12b, and the detection surface of the rear touch sensor 14 all have substantially the same shape and size, and are aligned in a straight line along the thickness direction of the casing 10 (a Z-axis direction). The rear touch sensor 14 can be of various types as is the case for the front touch sensor 12b. Similarly to the front touch sensor 12b, the rear touch sensor 14 in this embodiment is a multi-point touch sensor capable of detecting a contact with an object in a plurality of places. A user grips the casing 10 of the information input device 1 with both hands and touches the detection surface of the front touch sensor 12b or of the rear touch sensor 14 with his/her finger, to thereby make an operation input to the information input device 1. Because the front touch sensor 12b and the rear touch sensor 14 are both a multi-point touch sensor, the user can make a diversity of operation inputs by touching these touch sensors with a plurality of his/her fingers at once.

Though not shown in FIGS. 1A and 1B, the information input device 1 may include, in addition to the front touch sensor 12b and the rear touch sensor 14, various operating members for receiving an operation input of the user, for example, buttons and switches, on the front, rear, and side faces of the casing 10 or in other places.

A gyroscope 16 is disposed inside the casing 10 of the information input device 1 as a sensor for detecting a tilt of the casing 10. The gyroscope 16 is a piezoelectric vibrating gyroscope or the like, and detects the rotation of the casing 10 about a plurality of gyro reference axes set in the casing 10 to output an electrical signal that corresponds to the detected rotation. The gyro reference axes in this embodiment are an X axis, which runs in the direction of the longer sides (the lateral direction) of the display 12a, and a Y axis, which runs in the direction of the shorter sides (the longitudinal direction) of the display 12a. The gyroscope 16 outputs a signal corresponding to the rotation of the casing 10 about each of these gyro reference axes.

Figure 2:
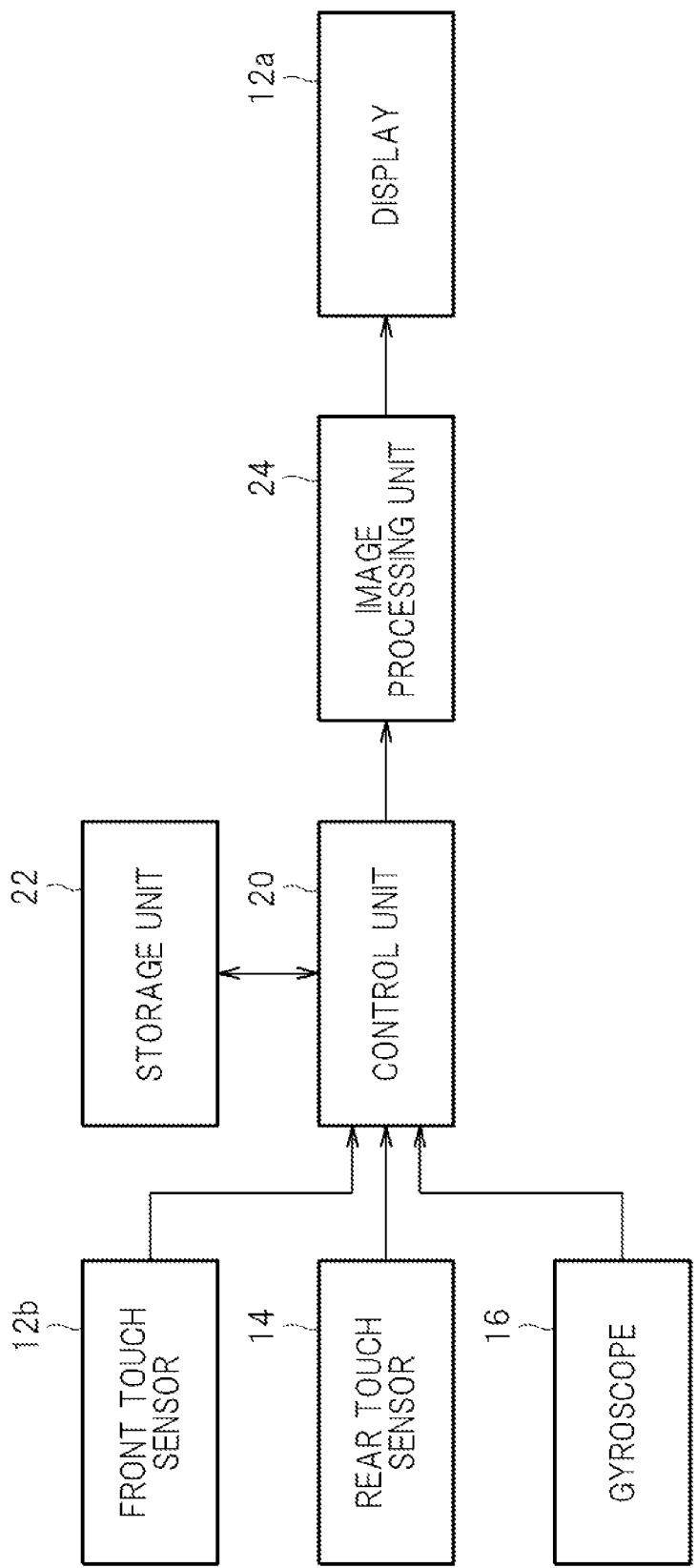
FIG. 2 A block diagram illustrating the internal structure of the information input device according to the embodiment of the present invention.

FIG. 2 is a structural block diagram illustrating the internal structure of the information input device 1. As illustrated in FIG. 2, the information input device 1 is structured to include therein a control unit 20, a storage unit 22, and an image processing unit 24. The control unit 20 includes, for example, a CPU or the like and executes various kinds of information processing as programmed by a program stored in the storage unit 22. A concrete example of the processing executed by the control unit 20 is described later. The storage unit 22 is, for example, a memory device such as a RAM or a ROM, or a disk device, and stores a program executed by the control unit 20 and various kinds of data. The storage unit 22 also functions as a working memory of the control unit 20.

The image processing unit 24 is structured to include, for example, a GPU and a frame buffer memory, and draws an image to be displayed on the display 12a following an instruction that is output by the control unit 20. To give a concrete example, the image processing unit 24 includes a frame buffer memory suited to a display area of the display 12a, and the GPU writes an image in the frame buffer memory at regular time intervals following an instruction from the control unit 20. An image written in the frame buffer memory is converted into a video signal at given timing to be displayed on the display 12a.

Functions implemented by the information input device 1 in this embodiment are described below. In this embodiment, the information input device 1 executes a game application program stored in the storage unit 22, to thereby generate a spatial image that shows the inside of a virtual three-dimensional space and to display the spatial image on the display 12a. While this spatial image is displayed, the user performs an operation of tilting the casing (hereinafter, referred to as tilting operation) to make an operation input to the information input device 1. In response to the operation input, the information input device 1 executes processing of changing the direction of a view point which is set within the virtual three-dimensional space (hereinafter, referred to as a viewing direction VD). In other words, a parameter indicating the viewing direction VD is a parameter to be operated by the tilting operation. The information input device 1 then generates an image that shows the inside of the virtual three-dimensional space viewed in the viewing direction VD which has been changed in accordance with the tilting operation, and displays the image on the display 12a. This enables the user to view the inside of the virtual three-dimensional space while changing the viewing direction by tilting the casing 10. To implement this processing, the gyroscope 16 functions in this embodiment as an operation input device for receiving an operation input that is made by the user's tilting operation.

Figure 3:
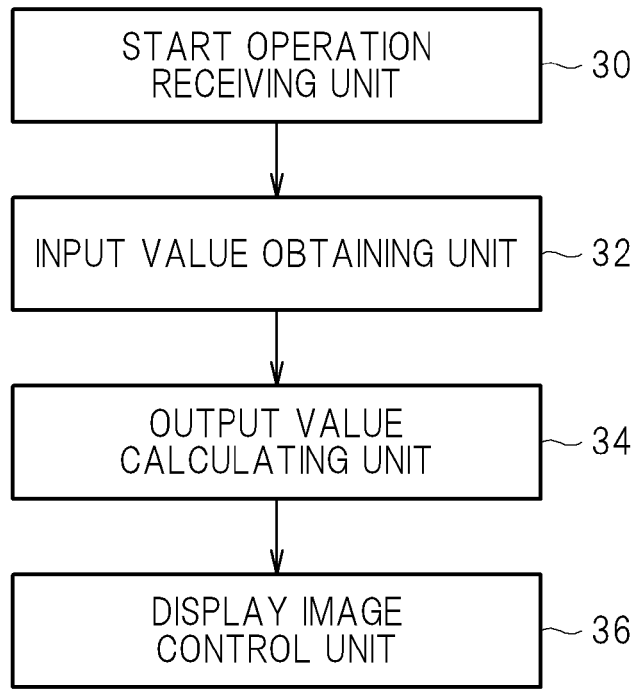
FIG. 3 A function block diagram illustrating functions of the information input device according to the embodiment of the present invention.

As illustrated in FIG. 3, the information input device 1 functionally includes a start operation receiving unit 30, an input value obtaining unit 32, an output value calculating unit 34, and a display image control unit 36. These functions are implemented by the control unit 20 by executing a program that is stored in the storage unit 22. The program may be provided, for example, by being stored in an optical disc, a memory card, or other such computer-readable information storage media, or may be provided to the information input device 1 via a communication network such as the Internet.

The start operation receiving unit 30 receives an input of a given start operation from the user. The input value obtaining unit 32, which is described later, obtains an input value indicating the specifics of a tilting operation performed by the user after the start operation is received. This way, the user can start a tilting operation in which the casing 10 is tilted after executing the start operation, and thereby avoid accidentally changing the tilt of the casing 10 and changing the viewing direction VD while playing a game without intending to change the viewing direction VD.

Figure 4:
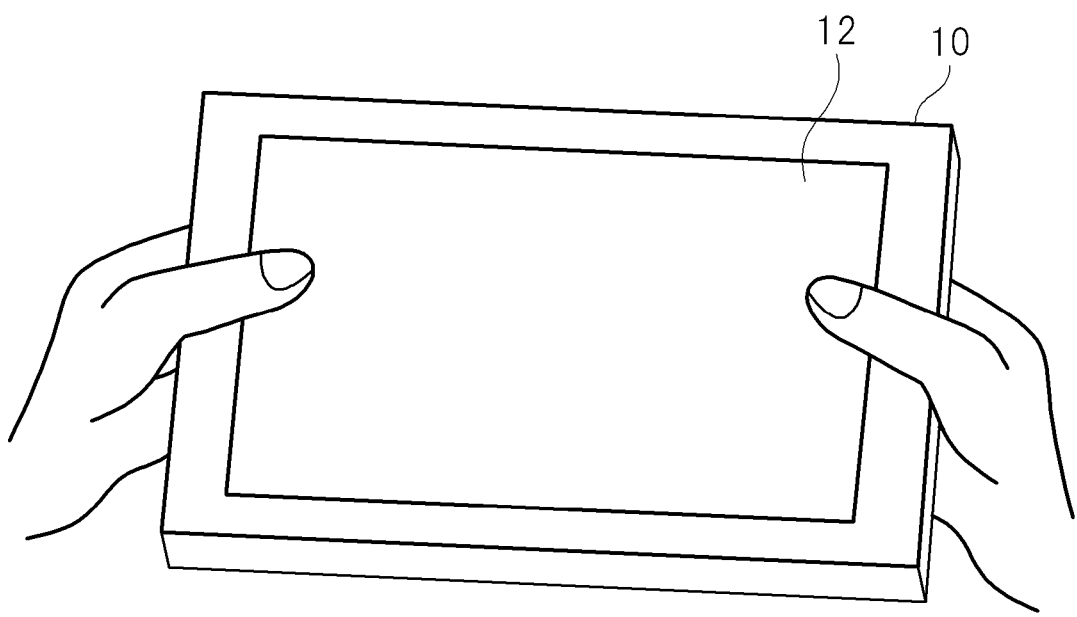
FIG. 4 A diagram illustrating how a user grips a casing of the information input device according to the embodiment of the present invention.

The start operation in this embodiment is an operation in which the user gripping the casing 10 between both hands touches each of the front touch sensor 12b and the rear touch sensor 14 with at least one finger of each hand (hereinafter, referred to as gripping operation). Specifically, as illustrated in FIG. 4, the user touches a given area of the front touch sensor 12b on the user's left side with his/her left thumb and touches a given area of the rear touch sensor 14 on the right side viewed from the rear face with the index finger or other fingers of the user's left hand. The user similarly touches a given area of the front touch sensor 12b on the user's right side with his/her right thumb and touches a given area of the rear touch sensor 14 on the left side viewed from the rear face with the index finger or other fingers of the user's right hand. The start operation receiving unit 30 receives detection results of the front touch sensor 12b and the rear touch sensor 14 to determine whether or not the user has performed this gripping operation. Specifically, the start operation receiving unit 30 determines whether or not the user has performed the gripping operation by, for example, determining whether or not the user is touching each of four given areas in total, namely, the left and right sides of the front touch sensor 12b and the left and right sides of the rear touch sensor 14, with one or more fingers. Alternatively, the start operation receiving unit 30 may determine that the user has performed the gripping operation through simpler processing which detects that the user's fingers are in contact with the front touch sensor 12b in any two or more places and with the rear touch sensor 14 in any two or more places. The user naturally grips the left and right sides of the casing 10 with both hands to perform a tilting operation. Using this gripping operation as a start operation therefore allows the user to start a tilting operation after performing the start operation without feeling odd.

The input value obtaining unit 32 obtains an input value I, which indicates the specifics of a tilting operation executed by the user, based on a detection result of the gyroscope 16. The input value obtaining unit 32 in this embodiment calculates the input value I using a detection result of the gyroscope 16 for every unit time (for example, 1/60 second) after the start operation receiving unit 30 detects that the user has performed the start operation. The input value I here is a two-dimensional quantity constituted of a pair of numerical values, an x component value Ix and a y component value Iy, and is a value indicating a relative tilt of the casing 10 relative to an initial casing direction EDi (namely, the direction and amount of tilt of the casing 10 from the initial casing direction EDi). The initial casing direction EDi is a direction indicating a posture that the casing 10 is in when the user performs the start operation, and is a normal line direction of the rear touch sensor 14 at the time of detection of the start operation by the start operation receiving unit 30. In the following description, a plane parallel to the touch panel 12 and the rear touch sensor 14 at the time of detection of the start operation is referred to as tilting operation reference plane RP. The user usually grips the casing 10 so that the display 12a is in front of the user, and it is therefore considered that the initial casing direction EDi substantially coincides with the user's viewing direction at the time the start operation is performed.

Figure 5:
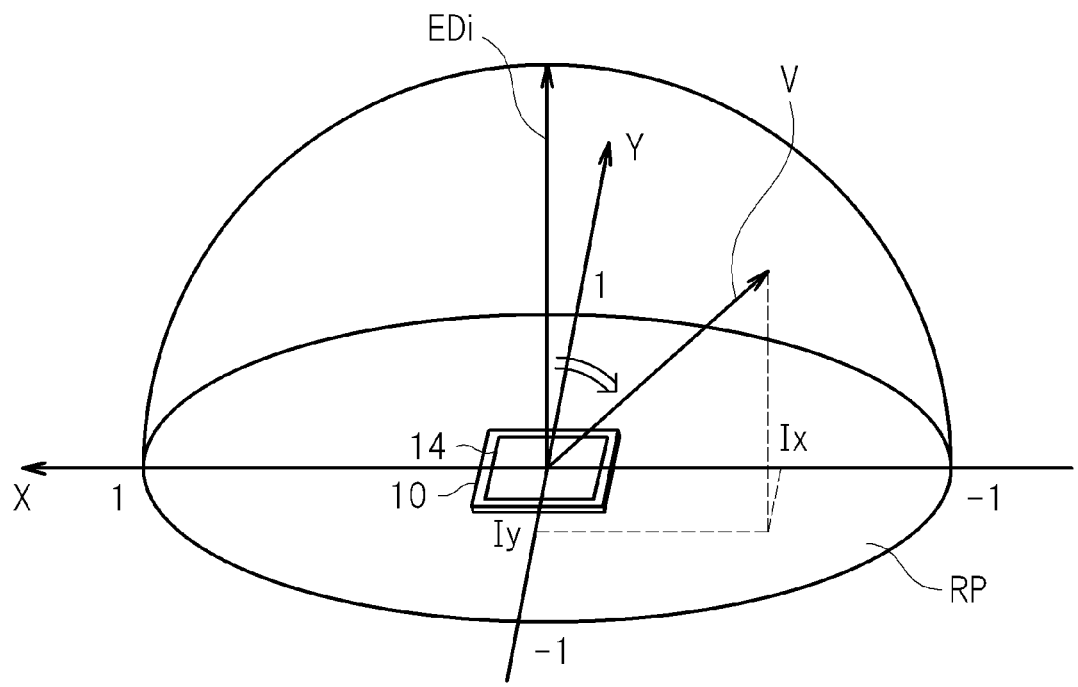
FIG. 5 An explanatory diagram illustrating a relation between a normal line vector, which indicates the posture of the casing, and an input value.
Figure 6A:
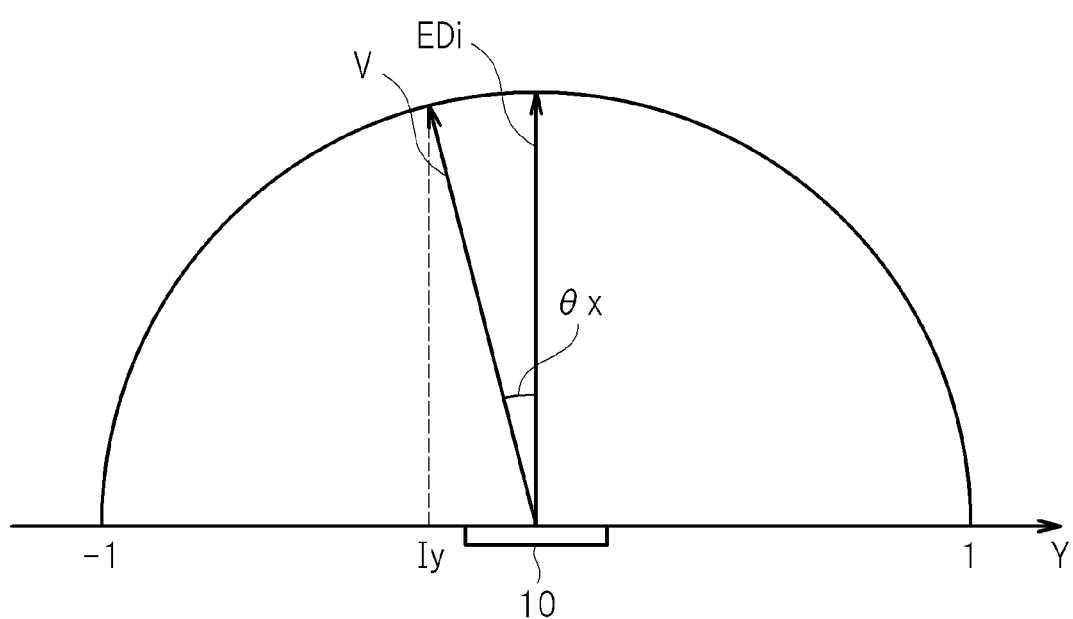
FIG. 6A A diagram illustrating the normal line vector of FIG. 5 viewed from the negative direction of an X axis.
Figure 6B:
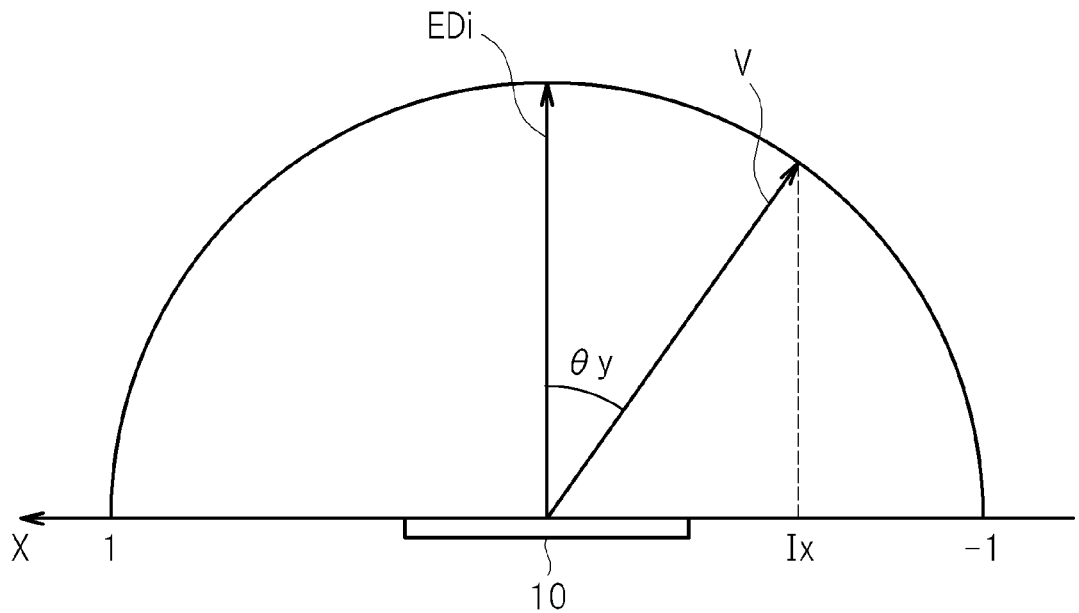
FIG. 6B A diagram illustrating the normal line vector of FIG. 5 viewed from the negative direction of a Y axis.

The x component value Ix and the y component value Iy are specifically values respectively indicating the X coordinate and Y coordinate of a projection point that is obtained by projecting, onto the reference plane RP, a unit vector (hereinafter, referred to as normal line vector V) directed in a normal line direction (hereinafter, referred to as casing direction ED) of the rear touch sensor 14 at the time the user performs a tilting operation. FIG. 5 is an explanatory diagram illustrating a relation between the normal line vector V and the input value I. FIG. 6A illustrates the normal line vector V of FIG. 5 viewed from the negative direction of the X axis, and FIG. 6B illustrates the normal line vector V of FIG. 5 viewed from the negative direction of the Y axis. These drawings illustrate a posture that the casing 10 is in at the time the start operation is performed, and the direction of the casing 10 after the tilting operation is omitted from the drawings. As understood from these drawings, the x component value Ix and the y component value Iy each take a value within a numerical value range from a minimum value −1 to a maximum value 1, with the magnitude of the normal line vector as 1, and the pair of component values indicate how much the casing 10 has been rotated by the user about the X axis and the Y axis respectively relative to the initial casing direction EDi. In other words, when the rotation angles of the casing 10 rotated about the X axis and the Y axis as a result of the tilting operation are given as θx and θy, respectively, the input value obtaining unit 32 can use the rotation angles θx and θy obtained from a detection result of the gyroscope 16 to obtain the x component value Ix and y component value Iy of the input value I. Specifically, the following relations are established:

$Ix = \sin \theta y$ $Iy = \sin \theta x$

Here, the positive direction in the rotation about the X axis is a clockwise rotation direction viewed from the negative direction of the X axis, and the positive direction in the rotation about the Y axis is a counterclockwise rotation direction viewed from the negative direction of the Y axis. It is also assumed that the user does not tilt the casing 10 over 90 degrees from the initial casing direction EDi in any of the left, right, forward, and backward directions.

In the following description, a time at which the start operation receiving unit 30 detects the start operation is t=0 and, subsequently, until the start operation receiving unit 30 detects an ending operation, the value t which indicates time is incremented by 1 every time the unit time elapses. The input value I that is obtained by the input value obtaining unit 32 at the time t is expressed as I(t), and the x component value and y component value of the input value I(t) are expressed as Ix(t) and Iy(t), respectively. At t=0, the direction of the normal line vector V coincides with the initial casing direction EDi, and Ix(0) and Iy(0) are therefore 0. The casing direction ED at the time t is expressed as ED(t) in the following description.

Figure 7:
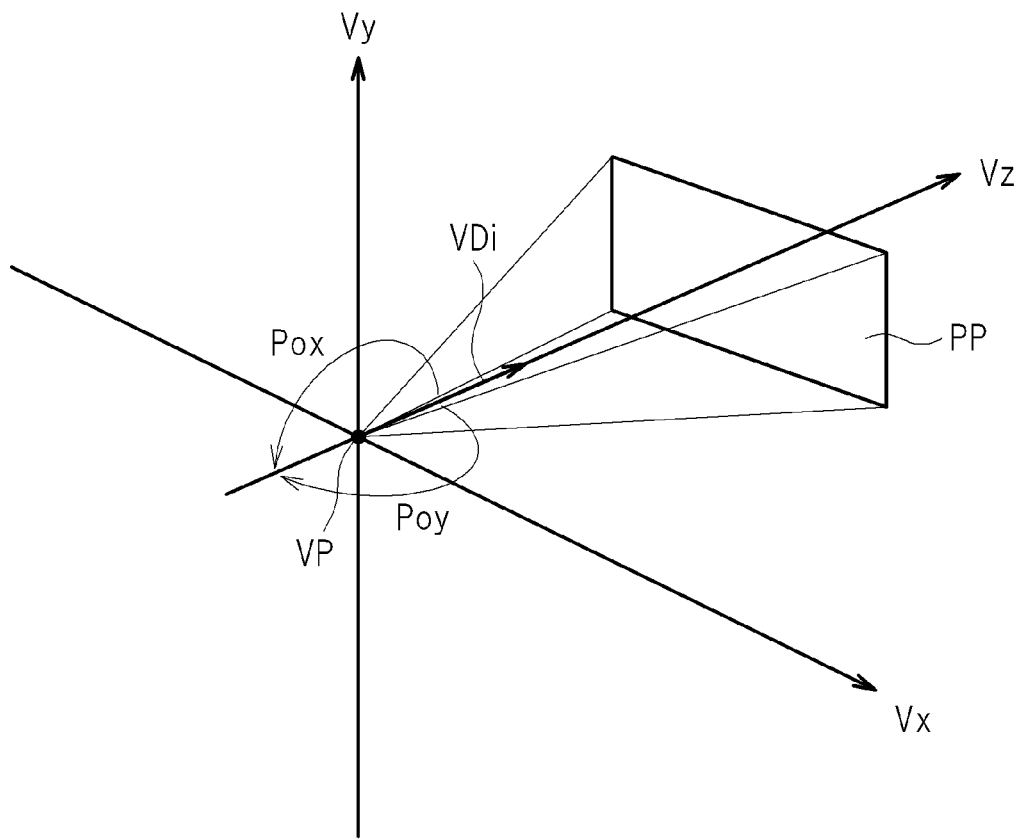
FIG. 7 An explanatory diagram illustrating a relation between a view point coordinate system and an output angle value that is observed at the time a start operation is detected.

The output value calculating unit 34 calculates an output value Po of a parameter to be operated based on a plurality of input values I obtained by the input value obtaining unit 32 while the user is performing the gripping operation. The parameter to be operated in this embodiment is, as described above, the viewing direction parameter which indicates the viewing direction VD set in the virtual three-dimensional space. Specifically, the output value Po of the viewing direction parameter is constituted of two output angle values, Pox and Poy, which indicate the orientation of the viewing direction VD with an initial viewing direction VDi as the reference. The initial viewing direction VDi is a viewing direction at the time of detection of the start operation. These output angle values Pox and Poy indicate the rotation angles of the viewing direction VD rotated about two reference axes, which are defined based on a view point coordinate system at the time of detection of the start operation. The view point coordinate system is a coordinate system that uses a Vx axis, a Vy axis, and a Vz axis, which are orthogonal to one another. The Vx axis, the Vy axis, and the Vz axis correspond to the lateral screen direction of the display 12a, the longitudinal screen direction of the display 12a, and the viewing direction VD, respectively. Specifically, the output angle values Pox and Poy respectively indicate the angle of rotation about the Vx axis and the angle of rotation about the Vy axis in the view point coordinate system at the time of detection of the start operation. FIG. 7 is an explanatory diagram illustrating this relation between the view point coordinate system and the output angle values Pox and Poy, and illustrates a position VP of the view point set within the virtual three-dimensional space, the initial viewing direction VDi, and an image projection plane PP. The output angle values Pox and Poy are what are calculated by the output value calculating unit 34. The viewing direction VD is a direction that is obtained by rotating the initial viewing direction VDi by an angle determined by the output angle values Pox and Poy. In other words, the output angle values Pox and Poy are values that indicate the magnitudes of rotation in the two reference axis directions, the Vy-axis direction and the Vx-axis direction, and the viewing direction VD is determined by rotating the initial viewing direction VDi in a direction indicated by the pair of angle values and by a magnitude indicated by the angle values.

A concrete example of how to calculate the output value Po is described below. The output value calculating unit 34 calculates as the output value Po a value obtained by changing a reference value Pr by a change amount Pd. The reference value Pr is a value determined by one of the plurality of input values I which is obtained by the input value obtaining unit 32. The change amount Pd is an amount that is determined by each of the plurality of input values I which are obtained by the input value obtaining unit 32 at predetermined intervals. As is the case for the output value Po, the reference value Pr is constituted of two angle values, reference angle values Prx and Pry. The change amount Pd, too, may be constituted of two angle values, a differential angle value Pdx which indicates the change amount of the angle value Pox and a differential angle value Pdy which indicates the change amount of the angle value Poy.

The output value calculating unit 34 in this embodiment updates the output value Po when the input value obtaining unit 32 obtains a new input value I at the elapse of the unit time. In the update, a reference value Pr(n) when the time t is n is a value determined by an input value I(n) which has been obtained by the input value obtaining unit 32 last time. The change amount Pd is calculated for each of all input values I(t) (t=0, 1, 2 . . . n) that are obtained after the time t is 0, at which the start operation is detected, and is reflected on the output value Po(n). As a result, the angle values Pox(n) and Poy(n) when the time t is n are values calculated by, for example, the following calculation expressions:

$$\begin{cases} Pox(n) = Prx(n) + \sum_{t=0}^{n} Pdx(t) \\ Poy(n) = Pry(n) + \sum_{t=0}^{n} Pdy(t) \end{cases}$$ [Math. 1]

A concrete example of how to calculate the reference angle values Prx(n) and Pry(n) is described now. These reference angle values, which are determined by the input value I(n) when the time t is n, are each a value uniquely determined by a posture that the casing 10 is in when the time t is n. For example, Prx(n) and Pry(n) are values calculated by the following calculation expressions with the use of the x component value Ix(t) and y component value Iy(t) of the input value I(t):

$$Prx(n) = \sin^{-1}(\alpha \cdot Iy(n))$$

$$Pry(n) = \sin^{-1}(\alpha \cdot Ix(n))$$

where $\alpha$ is a coefficient determined in advance.

When $\alpha$ is 1, the reference angle values Prx(n) and Pry(n) calculated by the above calculation expressions match $\theta x$ and $\theta y$, respectively. In other words, the reference value Pr indicates a rotation angle at which the initial viewing direction VDi is rotated in a direction that coincides with the tilt direction of the casing direction ED(n) relative to the initial casing direction EDi and by an amount that coincides with the tilt amount of the casing direction ED(n) relative to the initial casing direction EDi. When $\alpha$ is smaller than 1, the reference value Pr indicates a rotation angle at which the initial viewing direction VDi is rotated in a direction that coincides with the tilt direction of the casing direction ED(n) relative to the initial casing direction EDi and by an angle that is smaller than the tilt amount of the casing direction ED(n) relative to the initial casing direction EDi. In the case where a is a value larger than 1, on the other hand, the reference value Pr indicates a rotation angle at which the initial viewing direction VDi is rotated by an angle that is larger than the tilt amount of the casing direction ED (n) relative to the initial casing direction EDi. In any case, by calculating the reference angle values Prx(n) and Pry(n) in this manner, the output value Po(n) includes a component that causes the initial viewing direction VDi to rotate in a direction corresponding to a posture that the casing 10 is in when the time t is n. The coefficient $\alpha$ may be a negative value. In this case, the direction of rotation from the initial viewing direction VDi that is indicated by the reference value Pr is the opposite direction from the tilt direction of the casing 10. While the example described above uses the same function for the calculation expression that calculates Prx(n) from Iy(n) and the calculation expression that calculates Pry(n) from Ix(n), the output value calculating unit 34 may calculate Prx(n) and Pry(n) by calculation methods different from each other. To give a concrete example, the output value calculating unit 34 may use, instead of the coefficient $\alpha$, coefficients $\alpha 1$ and $\alpha 2$ which differ from each other to calculate Prx(n) and Pry(n).

The reference angle value Prx may also be determined so that the ratio of the change of the reference angle value Prx to the change of the input value Iy within a range where the absolute value of the input value Iy exceeds a given threshold Ith is smaller than the ratio of the change of the reference angle value Prx to the change of the input value Iy within a range where the absolute value of Iy is equal to or less than the threshold Ith. To give a concrete example, the output value calculating unit 34 calculates the reference angle value Prx by the following calculation expression:

$$Prx(n) = \begin{cases} \sin^{-1}(\alpha \cdot Iy(n)) & (|Iy(n)| \leq Ith) \\ \sin^{-1}\left(\alpha \cdot Ith + \frac{1}{2}\alpha(Iy(n) - Ith)\right) & (Iy(n) > Ith) \\ \sin^{-1}\left(-\alpha \cdot Ith + \frac{1}{2}\alpha(Iy(n) + Ith)\right) & (Iy(n) < Ith) \end{cases}$$ [Math. 2]

This way, in the range where the absolute value of the input value Iy exceeds the threshold Ith, the coefficient by which Iy is multiplied is reduced to ½ and the ratio of the change of the reference angle value Prx per unit change of the input value Iy decreases accordingly. A change in the input value Iy is thus reflected on a change in the reference angle value Prx to a lesser degree when the input value Iy approaches an upper limit value (here, +1) and a lower limit value (here, −1). The ratio of the coefficient that is used in the range where the absolute value of the input value Iy is equal to or less than the threshold Ith and the coefficient that is used in the range where the absolute value of Iy exceeds the threshold Ith is ½ here, but may be other values than ½. Instead of using different calculation expressions for the case where the absolute value of the input value Iy is equal to or less than the threshold Ith and the case where the absolute value of Iy exceeds the threshold Ith, a single function that makes the ratio of the change of the reference angle value Prx to the change of the input value Iy smaller as the absolute value of the input value Iy increases (for example, a function that yields a negative value through second order differential) may be used to calculate the reference angle value Prx. In the case where the input value Ix is used to calculate the reference angle value Pry, too, a calculation expression similar to that of the reference angle value Prx described above can be used.

The differential angle values Pdx(t) and Pdy(t) which are determined by the input value I(t) can be, as are the reference angle values Prx(n) and Pry(n), angle values that indicate rotation angles at which the viewing direction VD is rotated in a direction determined by the input value I(t) and by an amount determined by the input value I(t). However, the differential angle values Pdx(t) and Pdy(t) are desirably values that are relatively small compared to the reference angle values Prx(t) and Pry(t) that are determined by the same input value I(t). These differential angle values are therefore calculated by a function different from the one used for the reference angle values. For example, the differential angle values Pdx(t) and Pdy(t) are respectively calculated by the following functions with the use of Iy(t) and Ix(t):

$$Pdx(t) = \sin^{-1}(F(Iy(t)))$$

$$Pdy(t) = \sin^{-1}(F(Ix(t)))$$

where F(x) represents a function determined in advance. The function F(x) is defined, for example, as follows:

$$F(x) = \begin{cases} \beta \cdot x^2 & (x \geq 0) \\ -\beta \cdot x^2 & (x < 0) \end{cases} \quad [\text{Math. 3}]$$

where β is a coefficient determined in advance. The coefficient β can be a positive value or a negative value as is the case with the coefficient α. The function F(x) may be limited so that the absolute value of F(x) does not exceed a given upper limit value. In this case, the absolute value of F(x) matches the upper limit value when the absolute value of x exceeds a given value. Similarly to the reference angle value Pr, Pdx(t) and Pdy(t) may be calculated by calculation expressions different from each other. To give a concrete example, the output value calculating unit 34 may vary the coefficient β in the calculation expression described above for the calculation of Pdx(t) and for the calculation of Pdy(t). This way, the change amount of the viewing direction VD can be varied at the same rotation amount for the rotation of the casing 10 about the Y axis and for the rotation of the casing 10 about the X axis.

As described above, the output value calculating unit 34 needs to calculate a new output value Po that reflects the input value I newly obtained by the input value obtaining unit 32 every time the unit time elapses. However, the output value calculating unit 34 does not always need to perform the calculation of the output value Po from the start, and it is sufficient if the reference value Pr for the last calculated output value Po is updated with a value that is determined by the newly obtained input value I and further changing the output value by a change amount that is determined by the newly obtained input value I. To give a concrete example, the output angle values Pox(n) and Poy(n) when the time t is n are calculated by the following calculation expressions with the use of the output angle values Pox(n−1) and Poy(n−1) when the time t is (n−1):

$$\begin{cases} Pox(n) = Pox(n-1) - Prx(n-1) + Prx(n) + Pdx(n) \\ Poy(n) = Poy(n-1) - Pry(n-1) + Pry(n) + Pdy(n) \end{cases} \quad [\text{Math. 4}]$$

To calculate the output value Po using these calculation expressions, the output value calculating unit 34 calculates the output angle values Pox(n−1) and Poy(n−1) when the time t is (n−1), and temporarily stores in the storage unit 22 the calculated output angle values Pox(n−1) and Poy(n−1) and the reference angle values Prx(n−1) and Pry(n−1) which have been used in the calculation. In the next calculation, the last output angle values and reference angle values stored in the storage unit 22 are used as well as reference angle values and differential angle values that are calculated from the newly obtained input value I(n) to calculate the output angle values Pox(n) and Poy(n) by the calculation expressions described above.

Alternatively, the output value calculating unit 34 may calculate the output angle values Pox(n) and Poy(n) by the following calculation expressions:

$$\begin{cases} Pox(n) = \sum_{t=0}^{n-1} Pdx(t) + Prx(n) + Pdx(n) \\ Poy(n) = \sum_{t=0}^{n} Pdy(t) + Pry(n) + Pdy(n) \end{cases} \quad [\text{Math. 5}]$$

In this example, the output value calculating unit 34 stores in the storage unit 22 an accumulated value which is the sum of the differential angle values Pdx that have been calculated since the start operation. When a new input value I(t) is obtained, the output value calculating unit 34 updates the accumulated value stored in the storage unit 22 by further adding the differential angle value Pdx(t) that is calculated from the input value I(t). The output value calculating unit 34 adds the reference angle value Prx(t) calculated from the input value I(t) to the updated accumulated value, to thereby calculate the output angle value Pox(t). The output angle value Poy(t) can be calculated by similar processing.

In the description that has been given, the output value calculating unit 34 calculates the change amount Pd for every input value I that is obtained after the start operation is detected, and reflects these change amounts Pd on the output value Po. Instead, the output value calculating unit 34 may reflect on the output value Po only the change amount Pd calculated from the input value I that is obtained after the user executes the start operation and after a given start condition is subsequently satisfied. The start condition in this case can be, for example, the elapse of a predetermined length of time since the detection of the start operation. The start condition may instead be the amount of change per unit time of the input value I becoming less than a given value. This way, the output value calculating unit 34 can calculate the output value Po so that the output value Po is determined based solely on the reference value Pr immediately after the user performs the start operation and, after a while from the start operation (or after the user begins keeping the casing 10 in a constant posture), starts changing the output value Po by the change amount Pd.

The display image control unit 36 updates an image displayed on the display 12a in accordance with the output value Po of the viewing direction parameter which is output by the output value calculating unit 34. The display image control unit 36 in this embodiment displays on the display 12a a spatial image that is a view of the inside of the virtual three-dimensional space along the viewing direction VD (t) at the time t which is a direction obtained by rotating the initial viewing direction VDi in a rotation direction that is determined by the output value Po(t) output by the output value calculating unit 34 at the time t and by a rotation amount that is determined by this output value Po(t). Repeating this processing for every unit time causes image elements included in the display image to move within the display image in response to changes in the output value Po. The image elements may be various objects placed within the virtual space or may be icons or the like in a menu screen.

The display image control unit 36 in this embodiment constructs in the storage unit 22 a virtual three-dimensional space in which objects such as game character objects and background objects are placed. The display image control unit 36 then instructs the image processing unit 24 to draw an image that is a view of the inside of the virtual three-dimensional space from the viewing direction VD, which is determined by the output value Po calculated by the output value calculating unit 34. Following the instruction, the GPU in the image processing unit 24 generates the image and writes the image in the frame buffer, to thereby display a game image on the display 12a. This provides the user with a view of the inside of the virtual three-dimensional space from the viewing direction VD that has been changed in accordance with the tilting operation performed by the user himself/herself.

Figure 8:
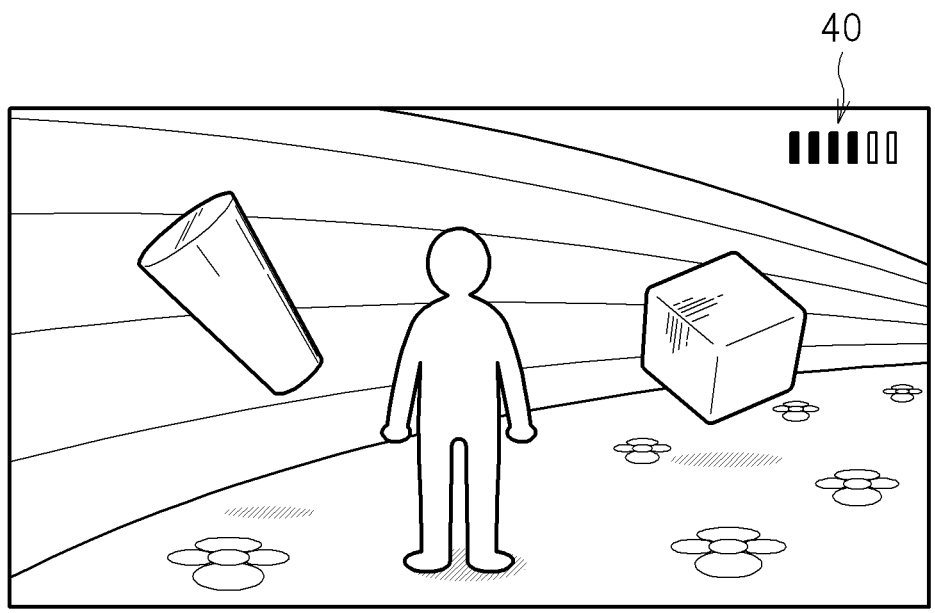
FIG. 8 A diagram illustrating an example of a display image that is displayed by the information input device according to the embodiment.

When updating a display image in accordance with the output value Po calculated by the output value calculating unit 34, the display image control unit 36 may include in the display image an image indicating the magnitude of a change amount that has been used for the calculation of this output value Po (hereinafter, referred to as indicator image 40). FIG. 8 is a diagram illustrating an example of a display image that includes the indicator image 40. The indicator image 40 particularly indicates the magnitude of a change amount determined by the input value I that has been obtained by the input value obtaining unit 32 last time. Specifically, when a display image is updated in accordance with the output value Po(t) calculated at the time t, the indicator image 40 displayed indicates the magnitudes of the differential angle values Pdx (t) and Pdy(t) calculated from the input value I(t). The indicator image 40 may be an image that changes depending on the sum of the respective absolute values of the differential angle values Pdx(t) and Pdy(t), or may be an image that changes depending on the square sum of Pdx(t) and Pdy(t). Alternatively, the indicator image 40 may be an image that indicates the respective magnitudes of Pdx(t) and Pdy(t). The indicator image 40 may also be an image that indicates, instead of the very magnitudes of Pdx(t) and Pdy(t), the magnitudes of Pdx(t) and Pdy(t) in relation to the magnitude of the reference value Pr (t) or the output value Po(t), for example. Displaying the indicator image 40 as this informs the user explicitly of the current changing state of the operation target parameter.

In this embodiment, the processing of updating the operation target parameter in accordance with the input value I described above is executed repeatedly until the user performs a given ending operation. In response to the given ending operation performed by the user, the output value calculating unit 34 ends the processing of calculating the output value Po of the operation target parameter, and the display image control unit 36 displays an image of the virtual three-dimensional space viewed from the viewing direction VD that is maintained in a direction determined by the output value Po at the time of the ending operation.

The ending operation is specifically an operation of breaking up the state in which the user is performing the gripping operation (i.e., the user is touching each of the front touch sensor 12b and the rear touch sensor 14 with fingers of both hands). In this example, the user keeps performing the gripping operation while executing the tilting operation. In other words, after the user starts the gripping operation, the start operation receiving unit 30 determines whether or not the gripped state is maintained repeatedly at regular time intervals. Determining that the gripped state has ended (i.e., that the user has broken contact between a finger and one of the given areas of the respective left and right sides of the front touch sensor 12b and the rear touch sensor 14), the start operation receiving unit 30 receives this operation as the ending operation for ending the tilting operation, and outputs a message to that effect to the input value obtaining unit 32. This enables the input value obtaining unit 32 to continue the processing of obtaining an input value that indicates the specifics of an operation input made by the user while the user keep performing the gripping operation (i.e., from the execution of the start operation to the execution of the ending operation), and to end the input value obtaining processing when the user executes the ending operation.

As has been described, in the information input device 1 according to this embodiment, the output value Po of a parameter to be operated is determined based on the reference value Pr and the change amount Pd. The reference value Pr is a component that reflects the input value I at one moment, whereas the change amount Pd is determined for each of a plurality of input values I obtained after the user performs the start operation, and the accumulated change amounts Pd are reflected on the output value Po. The contribution of the change amount Pd to the output value Po increases with time while the user keeps performing the tilting operation. Therefore, unlike the case where only the input value I at one point in time is used to calculate the output value Po, the output value Po can take a wider range of values. On the other hand, immediately after the tilting operation is started, the contribution of the change amount Pd to the output value Po is small compared to the reference value Pr, and the output value Po that substantially corresponds to the reference value Pr is therefore output. The user can change the viewing direction VD in a direction close to his/her intended direction by, for example, following up the start operation with a tilting operation for tilting the casing 10 in a direction to which the user wishes to change the viewing direction VD, and then immediately performing the ending operation.

The present invention can be embodied in other modes than the embodiment described above. For example, the parameter to be operated is a parameter indicating the viewing direction VD in the above description. However, the parameter to be operated can be various other parameters. For example, the information input device 1 may change the coordinates of the position of the view point VP set in a virtual three-dimensional space in accordance with the tilting operation of the user, or may change the position and traveling direction of a character placed in a virtual three-dimensional space or in a virtual plane in accordance with the tilting operation of the user. Alternatively, the information input device 1 may change a display range in which a virtual plane is displayed on the display 12a.

The information input device 1 may use various other detection means than a gyroscope, for example, a geomagnetic sensor, to detect the direction and tilt amount of the tilting operation performed by the user. The method of operation input made by the user is not limited to the tilting operation in which the casing 10 is tilted. For example, the information input device 1 may obtain the input value I by receiving an operation input made by the user on the front touch sensor 12b and the rear touch sensor 14. To give a concrete example of this processing, the user touches one point on the rear touch sensor 14 with one of his/her fingers. Maintaining this state, the user touches a different point on the rear touch sensor 14 with another finger. The information input device 1 in this case uses the point touched first with the user's finger as a reference point and obtains as the input value I a value that indicates the direction and distance of the point touched next by the user's finger relative to the reference point. This allows the user to make an operation input that indicates a direction and amount relative to a reference point with a touch sensor as in the case where the operation of tilting the casing 10 is performed after the start operation. Alternatively, the user may make an operation input for changing a parameter to be operated simply by touching one point on the rear touch sensor 14 with one of his/her fingers. The information input device 1 in this case uses, for example, the center point of the detection surface of the rear touch sensor 14 as a reference point and can obtain as the input value I a value that indicates the direction and amount of the point touched with the user's finger relative to the reference point. The user can use the front touch sensor 12b to make an operation input similar to the above-described operation input made on the rear touch sensor 14.

The input value I in the description given above is constituted of two component values that indicate the X coordinate and Y coordinate of a projection point obtained by projecting onto the reference plane RP a normal line vector, which indicates the direction of the casing 10. The information input device 1 may instead obtain, as the input value I, θx and θy which indicate the very angles of rotation of the casing 10 about the X axis and the Y axis to calculate the output angle values Pox and Poy from the rotation angles θx and θy. The input value I is a two-dimensional value indicating a direction and amount relative to a reference point in the description given above. However, the input value I may be a one-dimensional value. For example, the information input device 1 may obtain as the input value I only a coordinate value in the X-axis direction of a point where the front touch sensor 12b or the rear touch sensor 14 is touched with the user's finger. The information input device 1 obtains a plurality of input values I in this manner to calculate a one-dimensional output value Po from the obtained plurality of input values I, and executes scrolling processing in which a display image displayed on the display 12a is scrolled in the lateral screen direction by an amount determined by this output value Po. The input value I may also be a three-dimensional value constituted of a combination of three component values. For example, while the input value in the description given above is constituted of component values indicating the amounts of rotation about the X axis and the Y axis which are detected by the gyroscope 16, the input value may include, in addition to these component values, a component value Iz which indicates the amount of rotation about the Z axis orthogonal to both the X axis and the Y axis. In this case, the information input device 1 rotates an image displayed on the display 12a about the viewing direction VD in accordance with the user's operation of rotating the casing 10 about the normal line direction of the rear touch sensor 14, and the output value calculating unit 34 calculates an output angle value Poz which indicates the rotation amount of the display image based on the component value Iz.

The gyroscope 16, the front touch sensor 12b, or the rear touch sensor 14 function as operation input devices in the description given above. However, various other operation input devices, for example, an analog stick, can be used to receive the user's operation input. The start operation and the ending operation to give instructions to start and end an operation input for which the input value I is obtained are not limited to those described above, and may be, for example, the press of a button. Further, these operation input devices are all disposed inside the casing 10 of the information input device 1 in the description given above. However, these operation input devices may be separate from the information input device 1. To give a concrete example, the operation input devices may be a controller with a built-in gyroscope which is connected by cable connection or wireless connection to the information input device 1 for communication with the information input device 1, which is a household game machine, a personal computer, or the like. In this case, the user grips a casing of the controller to perform an operation of tilting the casing, and the information input device 1 calculates an output value based on a detection result of the gyroscope which is transmitted from the controller.

The invention claimed is:

1. A computer-readable non-transitory information storage medium having stored thereon a program for controlling a computer connected to an operation input device, which receives an operation input of a user, to function as:
   a start operation receiving unit configured to receive an input of a start operation comprising a gripping operation in which a user: (1) grips a casing of said operation input device between both hands, said casing comprising a front touch sensor and a rear touch sensor, wherein said sensors have left and right sides, and (2) simultaneously touches the left side of said front and rear touch sensors with fingers of a left hand and the right side of said front and rear touch sensors with fingers of a right hand, wherein performance of the start operation is required before tilting input in the form of tilting the operation input device by the user will be processed and recognized as a tilting operation;
   an input value obtaining unit configured to obtain, at a predetermined interval, an input value indicating specifics of the operation input received by the operation input device, wherein the input value obtaining unit obtains input in the form of said tilting operation which causes a change in a viewing direction of a user within a virtual three-dimensional space, wherein the viewing direction is changed in accordance with the tilting operation by changing the image of the inside of the virtual three-dimensional space, wherein any tilting of the operation input device without the start operation will be disregarded by the input value obtaining unit and not cause any change in the viewing direction; and
   an output value calculating unit configured to calculate an output value of a parameter to be operated, based on a plurality of input values obtained by the input value obtaining unit,
   wherein the output value calculating unit calculates as the output value a value obtained by changing a reference value by a change amount, the reference value being determined by one of the plurality of input values obtained by the input value obtaining unit, the change amount being determined by each of the plurality of input values which are obtained by the input value obtaining unit at predetermined intervals.

2. The computer-readable information storage medium according to claim 1, wherein the reference value is a value determined by an input value that the input value obtaining unit has obtained last time.

3. The computer-readable information storage medium according to claim 1, wherein the output value calculating unit outputs as the output value a value obtained by changing the reference value by a change amount that is determined by each of a plurality of input values obtained by the input value obtaining unit after the user executes a given start operation.

4. The computer-readable information storage medium according to claim 1, wherein the output value calculating unit outputs as the output value a value obtained by changing the reference value by a change amount that is determined by each of a plurality of input values obtained by the input value obtaining unit after the user executes a given start operation and after a given start condition is satisfied.

5. The computer-readable information storage medium according to claim 1, wherein, when the input value obtained by the input value obtaining unit exceeds a predetermined value, the output value calculating unit calculates the output value by using as the change amount an upper limit value which is determined in advance.

6. The computer-readable information storage medium according to claim 1,
wherein the operation input device comprises a sensor for detecting a tilt of a casing which is gripped by the user with hands,
wherein, when the user makes an operation input by tilting the casing, the input value obtaining unit obtains as the input value a value indicating a direction and amount of the tilt of the casing which is caused by the operation,
wherein the output value is a value indicating a direction and a magnitude,
wherein the reference value is a value indicating a direction and a magnitude that are determined by a tilt direction and tilt amount indicated by the one of the plurality of input values, and
wherein the change amount is an amount of change whose magnitude is determined by the amount of tilt in a direction determined by a tilt direction that is indicated by an associated input value.

7. The computer-readable information storage medium according to claim 6,
wherein the input value is constituted of a first input component value and a second input component value which indicate respective amounts of rotation about two reference axes,
wherein the output value is constituted of a first output component value and a second output component value which indicate respective magnitudes along two reference directions, and
wherein the output value calculating unit determines a change amount with respect to the first output component value based on the first input component value, determines a change amount with respect to the second output component value based on the second input component value, and determines the change amount with respect to the first output component value and the change amount with respect to the second output component value by calculation methods different from each other.

8. The computer-readable information storage medium according to claim 1, wherein the reference value is determined so that a ratio of a change of the reference value to a change of the input value in a range where an absolute value of the input value exceeds a given value is smaller than a ratio of the change of the reference value to the change of the input value in a range where the absolute value of the input value is equal to or less than the given value.

9. The computer-readable information storage medium according to claim 1, wherein the program controls the computer to further function as a display unit configured to display on a display screen an image indicating a magnitude of the change amount that is determined by an input value obtained by the input value obtaining unit last time when the output value calculating unit calculates the output value.

10. An information input device connected to an operation input device, which receives an operation input of a user, the information input device comprising:
a casing comprising a front touch sensor and a rear touch sensor, wherein said sensors have left and right sides;
a control unit;
a storage unit;
a display;
an image processing unit configured to generate a spatial image that shows the inside of a virtual three-dimensional space and to display the spatial image on the display;
a start operation receiving unit configured to receive an input of a start operation in which the user: (1) grips the casing between both hands, and (2) simultaneously touches the right side of the front and rear touch sensors with fingers of a right hand and the left side of the front and rear touch sensors with fingers of a left hand, wherein performance of the start operation is required before tilting input in the form of tilting the operation input device by the user will be processed and recognized as a tilting operation;
an input value obtaining unit configured to obtain, at a predetermined interval, an input value indicating specifics of the operation input received by the operation input device,
wherein the input value obtaining unit is configured to obtain input in the form of said tilting operation which causes a change in the viewing direction of the user within the virtual three-dimensional space, wherein the spatial image reflects the change in viewing direction which has been changed in accordance with the tilting operation, said spatial image being an image of the inside of the virtual three-dimensional space, wherein any tilting of the operation input device without the start operation will be disregarded by the input value obtaining unit and not cause any change in the viewing direction; and
an output value calculating unit for calculating an output value of a parameter to be operated, based on a plurality of input values obtained by the input value obtaining unit,
wherein the output value calculating unit calculates as the output value a value obtained by changing a reference value by a change amount, the reference value being determined by one of the plurality of input values obtained by the input value obtaining unit, the change amount being determined by each of the plurality of input values which are obtained by the input value obtaining unit at predetermined intervals,
wherein the control unit, storage unit, image processing unit, display, start operation receiving unit, input value obtaining unit, and output value calculating unit are in operable communication, and are housed in said casing.

11. The information input device according to claim 10, further comprising:
a touch sensor disposed on a front face of a casing of the information input device and a touch sensor disposed on a rear face of the casing; and start operation receiving unit configured to receive, as a start operation, an operation in which the user touches the touch sensor disposed on the front face of the casing with at least one finger of each of both hands and also touches the touch sensor disposed on the rear face of the casing with at least one finger of each of both hands, wherein the operation input device comprises a sensor for detecting a tilt of the casing, and wherein the output value calculating unit outputs as the output value a value obtained by changing the reference value by a change amount that is determined by each of a plurality of input values obtained by the input value obtaining unit after the start operation is received.

12. The information input device according to claim 11, wherein the start operation receiving unit receives, as an ending operation, an operation of breaking up a state in which the user touches the touch sensor disposed on the front face of the casing with at least one finger of each of both hands and also touches the touch sensor disposed on the rear face of the casing with at least one finger of each of both hands, and wherein, when the ending operation is received, the output value calculating unit ends the calculation of the output value.

13. A method of controlling an information input device, the method comprising:

a start operation step in which the user: (1) grips a casing of said information input device between both hands, said casing comprising a front touch sensor and a rear touch sensor, wherein said sensors have left and right sides, and (2) simultaneously touches the right side of the front and rear touch sensors with fingers of a right hand and the left side of the front and rear touch sensors with fingers of a left hand, wherein performance of the start operation step is required before tilting input in the form of tilting the operation input device by the user will be processed and recognized as a tilting operation;

an input value obtaining step of obtaining, at a predetermined interval, an input value indicating specifics of an operation input that is received by an operation input device for receiving an operation input of a user, wherein the input value obtaining step obtains input in the form of said tilting operation which causes a change in a viewing direction of the user within a virtual three-dimensional space, wherein the viewing direction is changed in accordance with the tilting operation by changing the image of the inside of the virtual three-dimensional space, and wherein any tilting of the operation input device without the start operation will be disregarded by the input value obtaining unit and not cause any change in the viewing direction; and an output value calculating step of calculating an output value of a parameter to be operated, based on a plurality of input values obtained in the input value obtaining step, wherein, in the output value calculating step, a value obtained by changing a reference value by a change amount is calculated as the output value, the reference value being determined by one of the plurality of input values obtained in the input value obtaining step, the change amount being determined by each of the plurality of input values which are obtained at predetermined intervals in the input value obtaining step.

14. The computer-readable information storage medium according to claim 1, wherein the viewing direction of the user inside the three-dimensional virtual space is rotated based on output angle values Pox and Poy, which represent rotation angles about two reference axes defined based on a user view point coordinate system at the time of detection of the start operation.

15. The computer-readable information storage medium according to claim 14, wherein the view point coordinate system is a coordinate system that uses a Vx axis, a Vy axis, and a Vz axis, which are orthogonal to one another, wherein the Vx axis, the Vy axis, and the Vz axis correspond to the lateral screen direction of a display, the longitudinal screen direction of a display, and the user viewing direction, respectively.

16. The computer-readable information storage medium according to claim 15, wherein the output angle values Pox and Poy respectively indicate the angle of rotation about the Vx axis and the angle of rotation about the Vy axis in the view point coordinate system at the time of detection of the start operation.

* * * * *